(12) United States Patent
Walser

(10) Patent No.: US 7,797,846 B2
(45) Date of Patent: Sep. 21, 2010

(54) REFERENCE BEAM GENERATOR FOR GENERATING GUIDE BEAMS FOR MARKING MACHINES

(75) Inventor: Bernd Walser, Heerbrugg (CH)

(73) Assignee: Leica Geosystems AG, Heerbrugg (CH)

( * ) Notice: Subject to any disclaimer, the term of this patent is extended or adjusted under 35 U.S.C. 154(b) by 125 days.

(21) Appl. No.: 12/300,027

(22) PCT Filed: May 2, 2007

(86) PCT No.: PCT/EP2007/003840

§ 371 (c)(1),
(2), (4) Date: Nov. 19, 2008

(87) PCT Pub. No.: WO2007/131626

PCT Pub. Date: Nov. 22, 2007

(65) Prior Publication Data

US 2010/0058598 A1    Mar. 11, 2010

(30) Foreign Application Priority Data

May 11, 2006    (EP)    .................................. 06113815

(51) Int. Cl.
  *G01B 11/26*    (2006.01)
  *G01C 15/12*    (2006.01)
(52) U.S. Cl. .......................................... 33/290; 33/289
(58) Field of Classification Search ................... 33/290, 33/289

See application file for complete search history.

(56) References Cited

U.S. PATENT DOCUMENTS

| | | | | |
|---|---|---|---|---|
| 2,346,006 A | * | 4/1944 | Burt | 33/290 |
| 4,247,809 A | | 1/1981 | Nessel | |
| 4,832,296 A | | 5/1989 | Schnepp | |
| 5,983,510 A | | 11/1999 | Wu et al. | |
| 6,065,217 A | | 5/2000 | Dong | |
| 6,293,024 B1 | * | 9/2001 | Fiebig et al. | 33/375 |
| 6,710,929 B2 | * | 3/2004 | Phuly et al. | 359/641 |
| 7,316,073 B2 | * | 1/2008 | Murray | 33/286 |
| 7,434,322 B2 | * | 10/2008 | Walser et al. | 33/286 |
| 2007/0113412 A1 | * | 5/2007 | Kallabis | 33/286 |

FOREIGN PATENT DOCUMENTS

| | | |
|---|---|---|
| EP | 0488046 A2 | 6/1992 |
| FR | 2699272 A1 | 6/1994 |

* cited by examiner

*Primary Examiner*—Christopher W Fulton
(74) *Attorney, Agent, or Firm*—Workman Nydegger

(57) ABSTRACT

A reference beam generator (1c) for guiding a marking machine, which can be moved in relation to the reference beam generator (1c), for producing ground markings has a support element with at least three adjustable legs (2a, 2b) as positioning elements relative to the surface of the ground (EOB) and a source of electromagnetic radiation for generating a first and a second guide beam which is emitted with a prespecified opening angle in a fan-shaped manner. In this case, two legs (2a') of the at least three adjustable legs (2a', 2b) can be adjusted by an adjusting component in an associated manner in opposite directions.

12 Claims, 3 Drawing Sheets

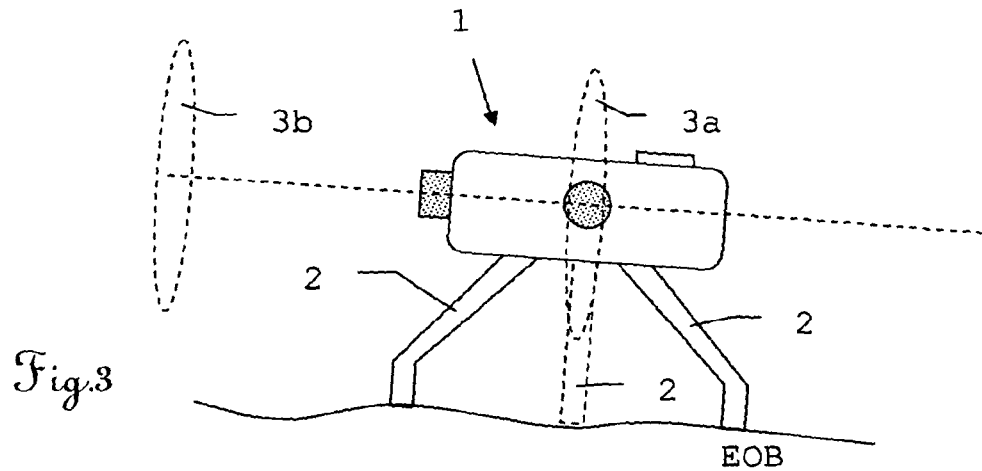
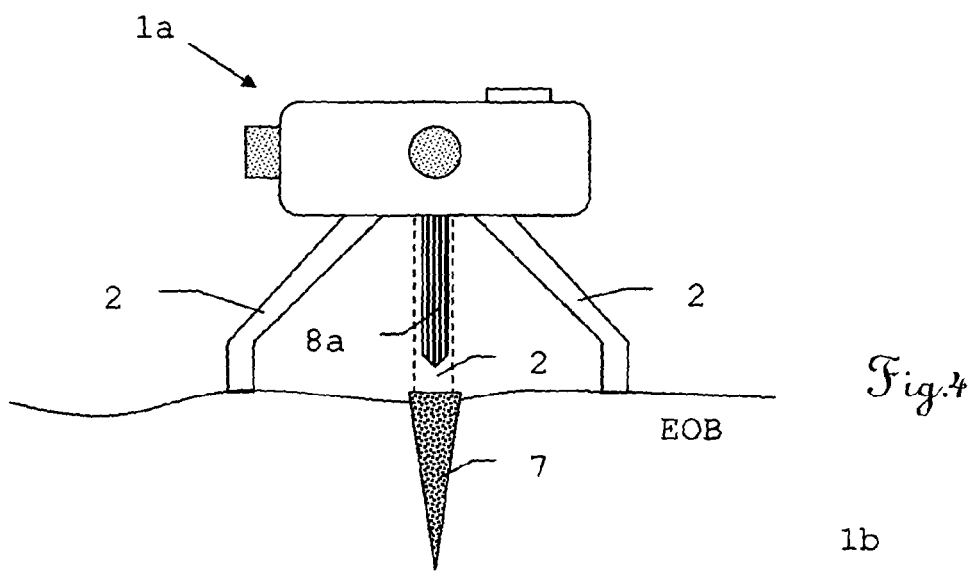
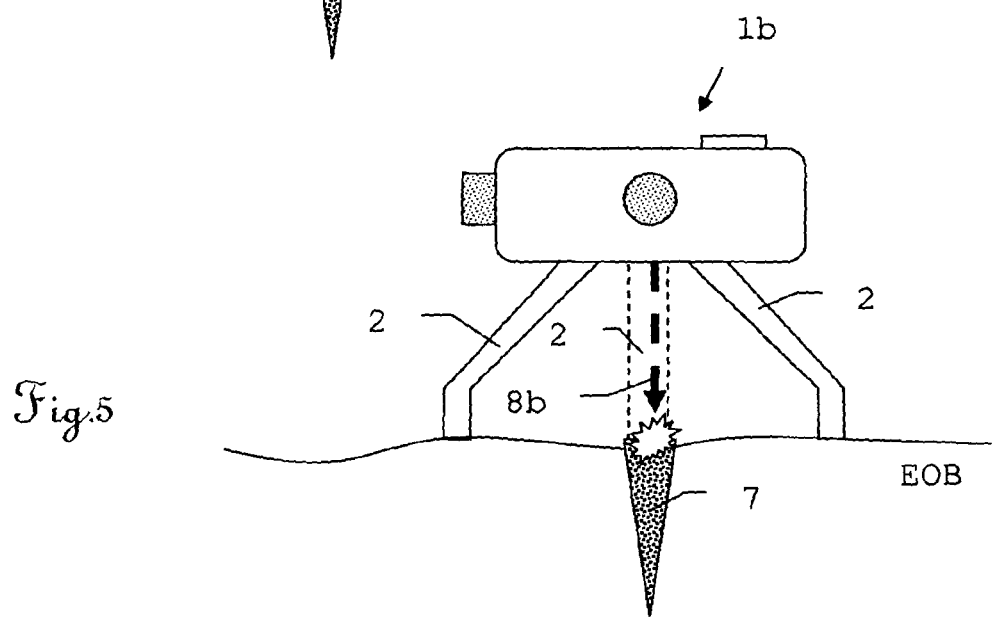

REFERENCE BEAM GENERATOR FOR GENERATING GUIDE BEAMS FOR MARKING MACHINES

The invention relates to a reference beam generator for generating guide beams for guiding a marking machine.

The use of optical guide beams which are generated by a base system and by means of which a marking machine can be guided is known for the marking of sports fields, as described, for example, in WO 2006/013386.

Such a system is also disclosed in DE 40 13 950. An apparatus for marking base areas, in particular floors in exhibition halls, is described. The apparatus automatically controls a vehicle having its own drive along the guide line of a laser beam, a marking device applying marks to the base area according to a specifiable marking programme as a function of the distance covered. The apparatus is intended in particular for marking exhibition halls. A beam is generated by a laser diode and an optical system and serves for establishing a straight line, for example one side of a field to be marked. The marking machine used for applying the marking substance has a detector for the laser radiation, the position of the marking machine being determined relative to the beam so that the machine can be automatically controlled on the basis of the laser beam.

Here, the laser diode is arranged on a laboratory machine which in turn is fastened on a base plate with guide strips for fixing with respect to a defined position. To carry out the marking work, the optical laser beam must be accurately oriented with the aid of an adjusting plate, the permissible height of incidence of the laser beam being limited since the marking machine should remain within range of signal reception during the movement.

Thus, the system is limited only to comparatively short distances and a level surface, as is the case, for example, within halls. Adjustment of the beam over relatively large distances remains problematic since a laser spot must be oriented in two dimensions. Moreover, irregularities of the ground, as occur particularly in the case of sports fields having a natural surface, rapidly result in the receiver of the marking machine losing the beam.

The application of special field markings by means of such systems is of course dependent on the handling properties and accuracy of the laser beam. The positioning and attitude thereof in space may be based on various reference quantities. In general, a corner of the sports field is chosen as a fixed point of the sports field to be marked. Depending on the type of sport, local circumstances and further circumstances, such as, for example, standard requirements, the markings are then defined in relation to other quantities. These may be, for example, already marked corners of a sports field, goal posts or base lines already present. Depending on conditions, slight deviations from ideal dimensions may result here, for example due to oblique-angled sports fields.

In order to define an appropriately adapted marking, one or two laser beams are emitted, generally in a fan shape, by a reference beam generator, these guide beams frequently being oriented relative to a reference target positioned at a reference point. Such a reference beam generator is described, for example, in EP 1 760 428. The reference beam generator has a laser transmission unit which comprises a laser and a beam diverger for producing a laser fan, preferably also a further optical component—e.g. a pentaprism—for splitting the laser fan into two part-fans. Because of the geometrical conditions of most sports fields, simultaneous generation and fixing of two or more beams or part-beams is advantageous since in this way two laser beams can be used without changing over the reference beam generator. The generator is formed in such a way that it can be fixed in a defined position, for example by means of a tripod or support plate. In general, the laser emitting the fan beam is mounted on a right-angled plate having two limbs, in particular in such a way that it emits the laser beam at a defined distance from a line to be marked, corresponding to the structural circumstances of the marking machine used. The detector of the marking machine is preferably in the form of a linear or two-dimensional array of photodiodes, which array is advantageously arranged on the control unit transversely to the laser light plane defined by the laser transmission unit of the reference beam generator.

The reference beam generator must be either made horizontal relative to the gravitational field or oriented relative to the Earth's surface. Since a horizontal, i.e. inclination-free, sports field is generally desired, the orientation with respect to the sports field surface generally coincides with levelling.

A simple solution to the positioning of the reference beam generator would be possible by the use of fixedly positioned and anchored bases having high mechanical strength. However, these present problems with regard to other requirements. Thus, there is the danger of injury in the case of a field on which games are played by people, and the possibility of mowing growth is adversely affected. Moreover, the bases thus arranged are in reality difficult to mount in a stable manner, so that a change in position may result through the mechanical load.

One alternative is the use of pure marking points, for example in the form of pegs. These could be sunk sufficiently deep so that mowing processes are not disturbed and injuries are substantially avoidable. Moreover, these pegs serve only as marking points and therefore need not be subjected to any mechanical load which might lead to a change of position. The reference beam generator and optionally also the reference targets can now be positioned relative to such pegs for orientation of the guide beams.

It is an object of the invention to provide a reference beam generator which permits simplified, more robust and more rapid fixing of laser beams for marking machines or the guidance thereof.

A further object of the invention is to provide such a reference beam generator which can be altered in its inclination or the inclination of the guide beams emitted by it, without there being a significant change of position relative to a reference point.

These objects are achieved or the solutions are further developed by the invention.

The invention is based on the fact that a change in the laser beam orientation is brought about by a coordinated and linked adjustment of two of the at least three legs, an adjustment of one of the two legs being associated with an adjustment of the respective other leg in the opposite direction.

Although three-legged systems have the advantage of high stability and easy positionability, the levelling thereof is problematic since the legs each cover an angular range of 120°. An arrangement with four legs at 90° is easier to orient and to level but is associated with disadvantages with regard to erection on uneven ground, so that three-legged solutions have advantages for reference beam generators. An adjustability equivalent to the four-legged solution is achieved by the opposite or counteracting adjustment of two of the three legs in a linked manner.

From the area of geodetic instruments, it is also known that the position of a plumbline oriented via a reference point remains stable within a range of a few millimetres if one leg of a tripod is changed in length. By changing the leg lengths, levelling can thus be effected without a large change in position. The adjustment can be effected manually by a user or automatically. The linkage of the change of leg lengths can be effected mechanically or electronically, it also being possible to realise an adjustment distance which is of the same or identical order of magnitude for both legs adjustable in a linked manner. As a result of this linkage, a point above the connecting axis of the legs moves along a curved path. By means of the length adjustment of the third leg, a movement orthogonal thereto is effected so that the combination of two legs adjustable in a coupled manner with a third independently adjustable leg results in an independent possibility for adjustment about two axes of inclination. The point can therefore be moved on a curved surface or sphere in two orthogonal directions. If the two laser fans or laser beams are coordinated with these degrees of freedom in inclination, these can be changed in their inclination independently of one another and thus oriented, the positioning remaining substantially unchanged relative to the reference point.

A possible method for erecting and orienting a working example of the reference beam generator according to the invention is therefore as follows:
1. unfolding the legs of the tripod of a reference beam generator,
2. switching on a laser plumbline as an optical pointer, the laser plumbline being coordinated with the tripod and being oriented perpendicular to the connecting plane of the legs,
3. erecting the tripod or reference beam generator over the reference point so that the laser spot strikes the reference point and without taking into account levelling,
4. changing the length of the two linked legs or of the third leg in order to adjust the inclination of the guide beams or to level the reference beam generator, the laser spot moving only slightly relative to the reference point.

In other embodiments according to the invention, a mechanical probe or pointer, for example a telescopic arm or telescopic pointer, can also be used instead of a laser plumbline.

As a result of the coordinated change, according to the invention, of the leg lengths, the laser spot or the mechanical pointer moves on a spherical surface or curved surface around the reference point, so that any deviations remain for the most part within a tolerable range.

A reference beam generator according to the invention is described in more detail below, purely by way of example, with reference to working examples shown schematically in the drawings. Specifically, FIG. 1 shows the schematic explanation of methods for marking sports fields;

FIG. 3 shows the schematic explanation of the positioning and orientation of a reference beam generator;

FIG. 4 shows the schematic representation of a first embodiment of a pointer for a reference beam generator according to the invention;

FIG. 5 shows the schematic representation of a second embodiment of a pointer for a reference beam generator according to the invention;

Figure 1:
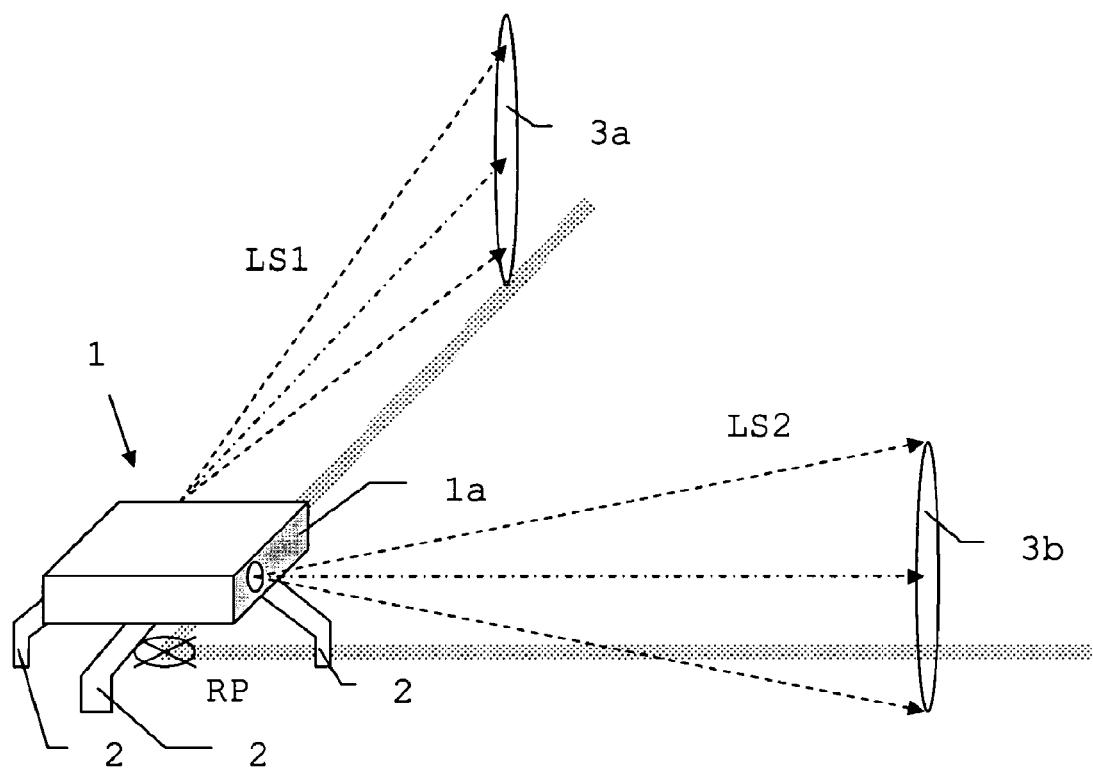

FIG. 1 schematically explains methods for marking sports fields by means of laser fans generated by reference beam generators. A situation in which a sports field is to be provided with markings of the generic type is shown. There, the line to be marked is specified via a reference beam generator 1 which is to be operated by an operator and is positioned on a corner point as reference point RP. A marking machine which is not shown here is guided by means of the optical link emitted by the reference beam generator 1 as guide beams LS1 and LS2. Since in general a plurality of lines placed at an angle a to one another are to be marked, in general two guide beams LS1 and LS2 are emitted at a predefined angle, e.g. of 90°, in two different directions, it being necessary for the two guide beams LS1 and LS2 to be oriented with respect to the surface or the horizontal and with respect to the sports field geometry to be produced. By one new positioning or optionally a plurality of new positionings of the reference beam generator 1, the entire sports field can finally be marked.

The reference beam generator 1 has a housing 1a as a support element which, however, can also be in the form of a L-shaped base plate having two limbs oriented at right angles to one another as a support element. Relative to this support element which can be fixed relative to the Earth's surface, the optical components of the reference beam generator 1 are adjustably mounted, the housing 1a or another support element itself being positioned by legs 2 relative to the Earth's surface. These can be adjusted relative to the Earth's surface for this purpose, accurate orientation being required owing to the generally larger structures to be marked. A source of electromagnetic radiation, for example a laser diode, having beam guide means for the emission of the radiation in two guide beams LS1 and LS2 is adjustably arranged in the housing 1a. The emitted radiation has an asymmetrical beam cross-section 3a and 3b with a specified opening angle, shown here elliptically by way of example. The beam cross-section 3a and 3b can be provided simply by an appropriate cross-section of the source or can be formed after generation. By such emission of the two guide beams LS1 and LS2, one or more marking machines can be guided for generating two lines of the sports field, the generated fans of the guide beams LS1 and LS2 providing the planes for orientation and alignment of the marking machines. With sufficiently favourable ground conditions, such as, for example, on very level surfaces without disturbances, the opening angle of the guide beams can also be kept small or even a circular or point-like cross-section can be used for achieving high intensities.

Figure 2:
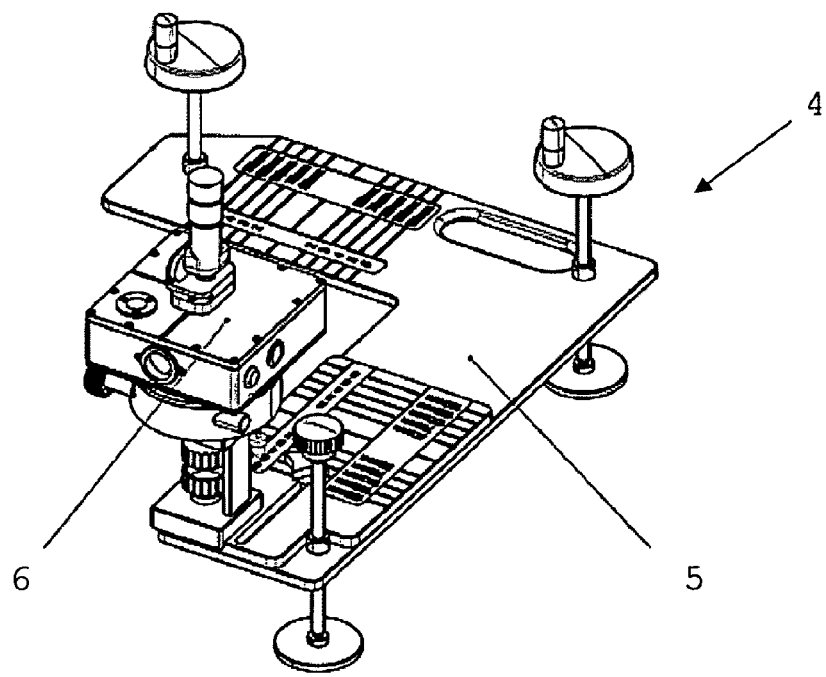
FIG. 2 shows the figurative representation of a reference beam generator of the prior art.

FIG. 2 shows a reference beam generator 4 of the prior art, as described, for example, in EP 1 760 428. The reference beam generator 4 has an L-shaped base plate 5 as a support element and a pivotable and displaceable beam unit 6 with source and beam guide means. Orientability of the base plate 5 is ensured by 3 legs, two of which are adjustable in length by means of a spindle or can be moved relative to the base plate. By adjustment of the legs, first one guide beam and subsequently the second guide beam must be precisely oriented, the two orientation processes mutually influencing one another and leading to a displacement of the base plate 5 relative to a reference point. While such small deviations need not be important in the case of short distances, they may lead to marked deviations during guidance of marking machines over relatively large distances, so that decoupled adjustability without significant displacement of the positioning relative to a reference point is required.

FIG. 3 explains the positioning and orientation of a reference beam generator 1 schematically. The reference beam generator 1 has three adjustable legs 2 which serve as positioning elements relative to the Earth's surface EOB. By positioning and orientation, the light fans with their beam cross-sections 3a and 3b are arranged in space so that they are fixed relative to a reference point as a starting point and represent guide beams for guiding a marking machine. The path of the guide beams is generally oriented relative to the surface of a structure to be marked, i.e. in the case of a generally inclined sports field, the guide beams are in certain circumstances not made horizontal but are likewise inclined according to the surface. In order to define the end point for precise orientation, a corresponding reference element may be used, as described, for example, in EP 1 760 428. Depending on the design of the reference beam generator 1 and the surface profile and the distance to the end point of the marking, a precise adjustment of the emission direction relative to the support element of the beam source or beam guide means for at least one of the guide beams may be advantageous. For adapting the guide beams to transverse inclinations, adjustable orientation of the beam cross-section can be used for at least one of the guide beams so that it can be oriented, for example, vertically relative to the Earth's surface.

The accurate orientation of guide beam and beam cross-section 3a or 3b is therefore dependent on the ground shape, so that corresponding adjustment possibilities—optionally in a plurality of stages—are advantageous. However, rapid rough orientation of the entire reference beam generator 1 should always be strived for. When advantageous circumstances are present, such as, for example, in the case of short distances or smooth or only slightly structured ground profiles, sufficiently accurate fixing of the guide beams can be effected even by a single adjustment of the total system.

FIG. 4 shows the schematic representation of a first embodiment of a pointer for a reference beam generator 1a according to the invention. For many fields of use, the positioning of the reference beam generator 1' is effected relative to a singular reference point which can be specified as a marking, for example, by a peg 7. Such pegs have the advantage of being mounted in such a way that they are sunk below the Earth's surface EOB or the growth thereof, so that, for example, mowing over said pegs by means of a lawnmower is possible. The sunken arrangement and the lack of load capacity owing to the possibly resultant changes of the position prevent direct positioning with load-bearing, physical contact with the peg 7. According to the invention, a mechanical pointer 8a, in particular mounted orthogonally relative to the plane defined by the emission directions of the guide beams, is therefore used for positioning via a reference point. The accurate orientation of the pointer tip relative to the peg 7 can easily be observed from the side, so that rapid and accurate positioning is possible.

A second embodiment of a pointer 8b for a reference beam generator 1b according to the invention is shown schematically in FIG. 5. In this example, the optical pointer 8b is provided by a laser beam emitted perpendicularly to the plane defined by the emission directions of the laser beams. The user observes the point of incidence of the laser beam on the Earth's surface EOB and adjusts the reference beam generator 1b until the laser beam strikes the peg 7 as centrally as possible.

Figure 6:
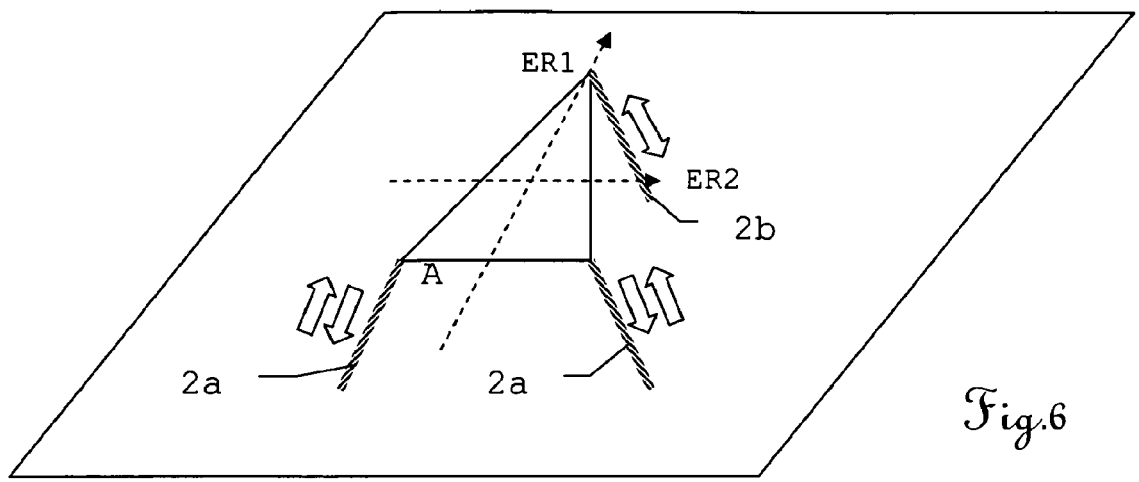
FIG. 6 shows the schematic representation of the geometrical relationships for a reference beam generator according to the invention.

The adjustability according to the invention is explained in FIG. 6 with reference to the geometrical relationships for a reference beam generator according to the invention. A plane, which is shown here by way of example as an abstract triangle, is defined by the three legs 2a and 2b. After its positioning relative to a reference point, this plane is adjusted so that the emission directions ER1 and ER2 of two laser beams are oriented relative to the ground or the profile thereof. An adjustment of the leg 2b results in a change in the inclination of the emission direction ER1 relative to the ground. An opposite, in particular equally large, change of the legs 2a adjustable in a linked manner leads to an increase or decrease in the inclination of the emission direction ER2. Mechanically or electronically linked adjustability results in a coordinated adjustment of the two legs 2a, i.e. the adjustment of one leg 2a is linked to the inevitable adjustment of the coordinated other leg 2a in the opposite direction. The linked adjustment of two of the three legs in opposite directions thus leads to decoupled orientability or orientation of the laser planes in two axes. Advantageously, the emission direction ER1 of the first guide beam can be oriented perpendicularly to the axis A connecting the legs 2a adjustable in a linked manner and the emission direction ER2 of the second guide beam can be oriented parallel to the axis A connecting the legs adjustable in a linked manner.

For a realised working example of a reference beam generator, there is the typical requirement of carrying out an adjustment by 8 arcmin. The adjustment of one leg by 1 mm results in a change of 16 arcmin, so that adjustment ranges of only 0.5 mm are sufficient for most intended uses or surfaces.

The plane formed here purely by way of example as a triangle can also be represented by a L-shaped support element, such a support element having a geometry with two limbs which are arranged at right angles and at the end points of which in each case one of the three legs is arranged. The emission directions of the guide beams are then fixed to correspond to the two limbs. By means of such a development, the two guide beams can be oriented independently of one another in their emission direction or inclination. The adjustment of one emission direction does not influence the inclination of the other emission direction. Any rotation of the beam cross-section relative to the ground can be compensated by adjusting or orientation elements.

Figure 7:
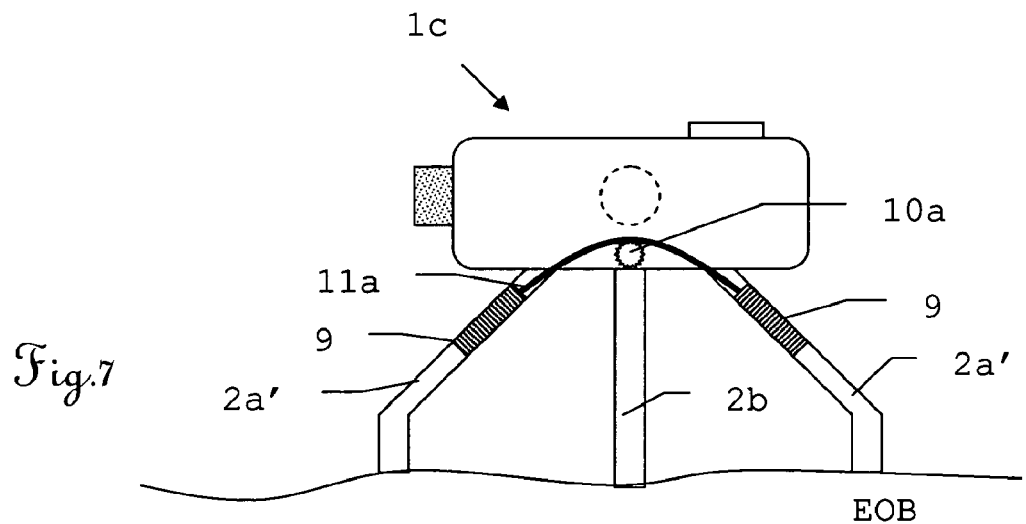
FIG. 7 shows the schematic representation of a first embodiment of an adjusting component for a reference beam generator according to the invention.

FIG. 7 shows the schematic representation of a first embodiment of an adjusting component for linked adjustment of two legs 2a' of the at least three adjustable legs of a reference beam generator 1c according to the invention in different directions. For better illustration, the pointers of FIG. 4 or FIG. 5 which can be integrated according to the invention are not shown in FIG. 7 and FIG. 8. The length of the legs 2a' is changed by the adjusting component within adjustment ranges 9 which are ensured, for example, by a telescopic formation of the legs. In this working example, the adjusting component has a mechanical coupling element for linked adjustment in opposite directions, which coupling element is formed here as a flexible toothed rack 11a displaceable via a gear wheel 10a. This produces an equal adjustment of the two legs 2a' in opposite directions, such an adjustment leaving the third leg 2b uninfluenced. For handling, the gear wheel 10a can be connected to a manually operable drive knob via a shaft or a further gear wheel. The scope of adjustment which can be effected according to the invention by the toothed rack 11a may be, for example, +/−50 mm, it also being possible to use a gear, for example for gear reduction, for achieving sensitive adjustability. Moreover, any of the three legs 2a' and 2b may also have further elements, such as, for example, telescopic extensions for compensating coarse irregularities of the ground, no linked adjustability being present for these.

Figure 8:
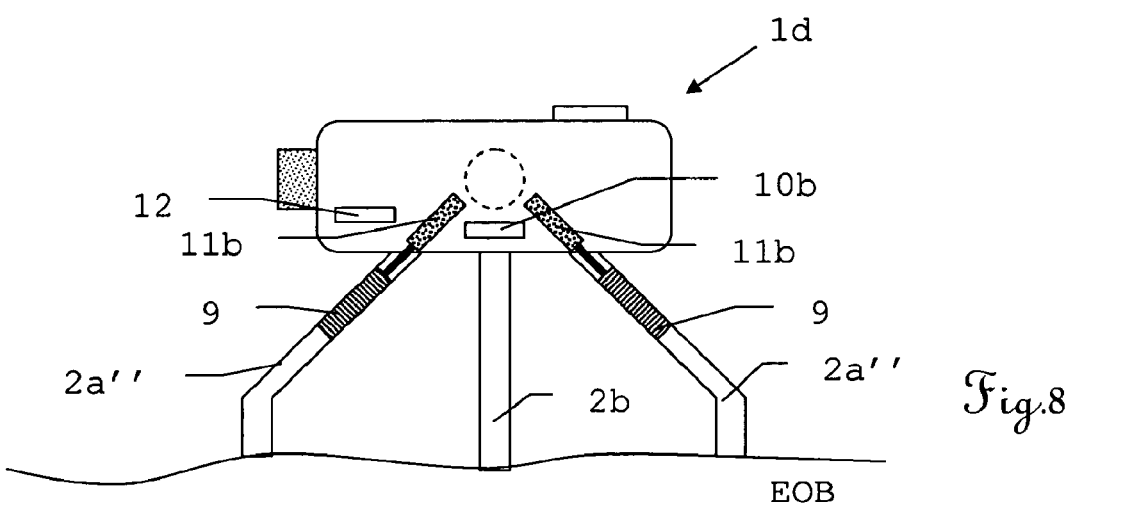
FIG. 8 shows the schematic representation of a second embodiment of an adjusting component for a reference beam generator according to the invention.

FIG. 8 schematically shows a second embodiment of an adjusting component for a reference beam generator 1d according to the invention. In this example, the adjusting component has an electronic control 10b and at least one electrical drive element 11b, the drive element resulting in a shortening or lengthening of the driven adjustment range 9 of a leg 2a". In order to permit additional, gravity-controlled levelling, it is possible to use a tilt metre 12 which is coupled to the electronic control 10b and permits automatic orientation of the reference beam generator 1d or of the guide beams.

The invention claimed is:

1. A reference beam generator, for guiding a marking machine moveable relative to the reference beam generator and intended for producing ground markings, comprising:
   a support element having at least three adjustable legs as positioning elements relative to the Earth's surface;
   a source of electromagnetic radiation for generating a first and a second guide beam emitted in a fan-shaped manner with a specified opening angle; and
   an adjusting component for linked adjustment in opposite directions of two legs of the at least three adjustable legs.

2. A reference beam generator according to claim 1, wherein the adjusting component has a mechanical coupling element for linked adjustment in opposite directions.

3. A reference beam generator according to claim 2, wherein the mechanical coupling element includes a displaceable toothed rack.

4. A reference beam generator according to claim 1, wherein the adjusting component has an electronic control and at least one electrical drive element.

5. A reference beam generator according to claim 1, wherein the emission direction of the first guide beam is oriented perpendicularly to the axis connecting the legs which are adjustable in a linked manner.

6. A reference beam generator according to claim 1, wherein the emission direction of the second guide beam is oriented parallel to the axis connecting the legs which are adjustable in a linked manner.

7. A reference beam generator according to claim 1, further comprising an optical or mechanical pointer orthogonal to the plane defined by the emission directions of the guide beams for positioning via a reference point.

8. A reference beam generator according to claim 1, further comprising a tilt meter.

9. A reference beam generator according to claim 1 further comprising a fine adjustment of the emission direction relative to the support element for at least one of the guide beams.

10. A reference beam generator according to claim 1, wherein the orientation of the beam cross-section for at least one of the guide beams is adjustable vertically relative to the Earth's surface.

11. A reference beam generator according to claim 1, wherein the support element has a geometry with two limbs arranged at right angles in an L-shaped geometry, in each case one of the at least three legs being arranged at the end points of the two limbs.

12. A reference beam generator according to claim 1, wherein the at least three adjustable legs are length-adjustable.

* * * * *